Jan. 3, 1956  C. A. ARNOLD  2,729,116
SAFETY SPINNING KNOB FOR STEERING WHEEL
Filed Jan. 7, 1952
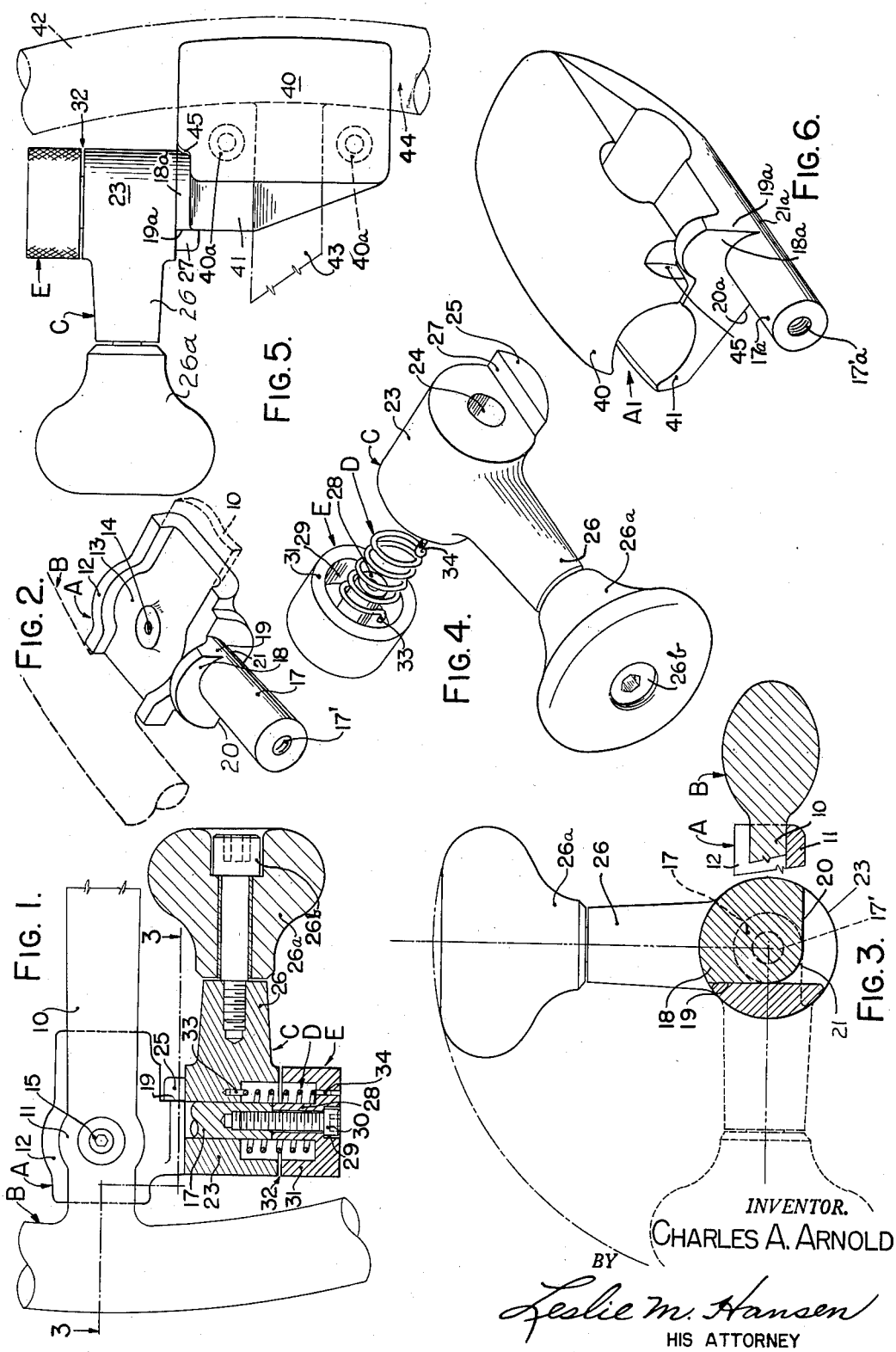
INVENTOR.
CHARLES A. ARNOLD
BY
Leslie M. Hansen
HIS ATTORNEY United States Patent Office 2,729,116
Patented Jan. 3, 1956

2,729,116

SAFETY SPINNING KNOB FOR STEERING WHEEL

Charles A. Arnold, San Jose, Calif., assignor of one-half to Herbert W. Weaver, Campbell, Calif.

Application January 7, 1952, Serial No. 265,222

4 Claims. (Cl. 74—557)

This invention relates to a spinning knob for mounting on the steering wheels of automotive vehicles.

In automotive vehicles which require frequent and extensive manipulation of the steering mechanism during use, it is tiring for an operator to have to turn the steering wheel in the conventional manner by gripping the rim.

Numerous types of spinning knobs are at present available for use on the steering wheels of automotive vehicles. Most, if not all such knobs, are satisfactory for use on automobiles where the steering mechanism is of the so-called non-reversible type. However, on vehicles which have steering mechanism of the so-called reversible type, when one dirigible support wheel of the vehicle encounters an obstruction, the impact tends to turn the dirigible wheel about its king pin as an axis, and to cause the steering wheel to spin around. If a spinning knob of the type which remains exposed above the plane of the steering wheel is mounted on the steering wheel when it is thus spun around, it will seriously injure, and may even break the operator's arm if it should be struck by the whirling knob.

As a result of the dangerous nature of such knobs, many safety regulations have been imposed forbidding their use on vehicles having reversible steering mechanisms. Since many warehouse trucks, fork lift trucks and tractors have reversible type steering mechanism, they are thus barred from using the knobs. Such vehicles normally require much more active manipulation of the steering wheel than do the road type automobiles and trucks with non-reversible type steering mechanism upon which the spinning knobs are authorized for use.

The present invention contemplates the provision of a safety type spinning knob for mounting on the steering wheel of an automotive vehicle. It also is an object of the invention to provide a self retracting spinning knob which will retract within the steering wheel except when positively held in wheel manipulating position. The invention tends to cause retraction of the spinning knob even in the event of failure of a retracting spring.

These and other objects and advantages of the invention will be apparent from the following description and the accompanying drawings, wherein:

Fig. 1 is a fragmentary plan view of a portion of the steering wheel of an automotive vehicle, with a spinning knob embodying the present invention mounted thereon, the knob supporting member being shown sectionally in its normal or retracted position.

Fig. 2 is a perspective view of the mounting bracket shown in Fig. 1, a portion of the steering wheel being shown in broken lines.

Fig. 3 is a fragmentary sectional view taken along line 3—3 of Fig. 1, the spinning knob being shown in solid lines in its retracted position, and in broken lines in operative position.

Fig. 4 is an exploded perspective view of the portions of the spinning knob which are mounted alternatively on the post portion of the bracket as shown either in Fig. 2 or Fig. 6.

Fig. 5 is a plan view of the parts shown in Fig. 4 mounted on a supporting bracket of the type shown in Fig. 6.

Fig. 6 is a perspective view of a modified form of mounting bracket.

Referring first to the structure shown in Figs. 1, 2 and 3, a mounting bracket A is mounted on the steering wheel B of an automotive vehicle, not shown. A steering knob assembly C is mounted for limited swinging movement on the bracket A, and is spring biased toward a retracted position by a torque coil spring D. The spring D is mounted within, and is retained in adjusted position by, a cap E.

The steering wheel B has a spoke 10 with a rounded portion 11 of slightly increased width formed therein. The bracket A has a body portion 12 with a recess 13 (Fig. 2) therein, shaped to receive the rounded, widened portion 11 of the spoke 10 closely therein. A screw 15 passes centrally through the rounded spoke portion 11, and is screwed into a threaded hole 14 (Fig. 2) in the bracket A. The screw 15 is drawn down tight to clamp the bracket A firmly to the spoke 10.

A knob supporting post 17 extends laterally from the bracket body portion 12, and a stop abutment 18 is provided at the base of the post 17. One side 19 (Fig. 3) of the abutment 18 defines an upright plane tangent to the radially inward side of the post 17 with respect to the steering wheel B. The bottom face 20 of the abutment 18 defines a substantially horizontal plane tangent to the under side of the post 17. The quadrant 21 of the abutment 18 between these two faces is co-extensive with the corresponding portion of the post 17.

The knob assembly C comprises a body portion 23 having a hole 24 therethrough for journal support on the post 17. A stop lug 25 extends endwise from the knob supporting body portion 23, and a knob supporting post 26 extends laterally from the body portion 23. A knob 26a (Fig. 1) is pivotally mounted on the end of the knob supporting post 26 by a screw post 26b.

The lug 25 has a flat inner face 27 (Fig. 4) disposed along a plane which is parallel to the axis of the central hole 24, and is spaced therefrom by a distance substantially equal to the radius of the post 17. Thus the stop lug 25 will engage bottom face 20 of the abutment 18 when the knob body 23 is swung to its retracted position shown in broken lines in Fig. 3, and will engage the upright abutment face 19 when the knob body is swung to its upright or operative position as shown in Fig. 1 and in solid lines in Fig. 3.

The cap E is cup shaped and is provided with a co-axial boss 28 internally thereof. The boss 28 is drilled axially and is counterbored at 29 in its outer end to receive a screw 30. The screw 30 passes axially through the boss 28 and is screwed into a threaded axial hole 17' (Fig. 2) in the outer end of the knob body support post 17. The cap E has a skirt portion 31 which is of a length to have a slight clearance at 32 (Fig. 1) from the knob body portion 23 when the boss 28 is in co-axial abutting relation with the end of the post 17.

The torsion coil spring D is of an internal diameter to fit freely over the co-axially aligned post 17 and cap boss 28, and has endwise extending end portions 33 and 34 respectively (Fig. 1) which are inserted in holes provided therefor in the knob body 23 and the cap E respectively. By loosening the cap screw 30 sufficiently to relieve the frictional engagement between the post 17 and cap boss 28, the cap E can be rotatively adjusted to adjust the torque of the spring D on the knob assembly C.

In operation, the device shown in Figs. 1 to 4 inclusive is mounted on the spoke 10 of the steering wheel B by fitting the recess 13 of the bracket A onto the rounded portion 11 provided therefor, and securing it in position thereon by means of the screw 15. This positions the post 17 with its axis disposed transversely of the spoke 10. The knob body 23 is pivoted freely on the post 17, and is retained thereon by the cap E.

The cap E is securely held against rotative displacement with respect to the post 17 by the screw 30. The torque spring D, acting between the fixed cap E and the rotatively movable knob body 23, tends to swing the knob body toward its retracted position shown in Fig. 1, and in broken lines in Fig. 3. In this position, the knob body 23 is arrested by engagement of the stop lug 25 with the bottom face 20 of the abutment 18.

The lug 25 brings the center of gravity of the knob assembly C inwardly of the axis of the supporting post 17. Therefore, even if the spring D should be broken, the knob assembly C would tend to gravitate toward its retracted position.

The torque exerted by the spring D on the knob assembly C may be regulated by loosening the cap screw 30, turning the cap E to increase or decrease the torque exerted on the knob body 23, and again tightening the cap screw 30.

In the modified form of the invention shown in Figs. 5 and 6, a mounting bracket A1 is provided for mounting a knob assembly C similar to that described previously herein. The bracket A1 comprises a two-part clamp, having an upper portion 40 and lower portion 41. These clamp portions are formed on their adjoining faces to fit over the rim 42, and a spoke 43, of a steering wheel 44. This modified knob supporting arrangement is intended for use on vehicles which are not provided with spokes having special mounting features such as that shown in Fig. 1. The clamp members 40 and 41 are releasably secured in clamping relation, by screws 40a, 40a (Figs. 5 and 6) which are inserted through holes, not shown, in the lower clamp member 41, and are screwed into relatively aligned threaded holes in the upper clamp member 40.

The lower clamp member 41 has an integrally formed, transversely extending mounting post 17a thereon, similar to the mounting post shown in Figs. 1 to 3 inclusive and described previously herein. Abutment faces 19a and 20a are provided adjacent the boss of the post 17a similar to the faces 19 and 20 of the structure shown in Figs. 2 and 3.

A recess 45 is provided in a side of the upper clamp member 40 to clear the knob supporting post 26 when the knob assembly C is swung upwardly to its operative position.

The operation of the device shown in Figs. 5 and 6 will be obvious from an understanding of the operation of the device shown in Figs. 1 to 3 inclusive, and explained previously herein.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims:

1. A spinning knob for a steering wheel comprising a body portion formed to have interfitting relation with a steering wheel element, a clamp member mounted to secure said body portion to the steering wheel, a support post mounted to project from said body portion transversely of a radius of the steering wheel and in the plane thereof, a knob support pivoted on said post, a knob mounted on said knob support for swinging movement from a retracted position within the plane of the steering wheel to upright extended position, a rotatively adjustable cap mounted to abut said post and spaced from said knob support to free said knob support for rotative movement relative to said post and said cap, a peripheral portion of the cap being exposed for grasping in adjusting the cap, a torsion coil spring mounted coaxially of said post within a cavity provided therefor between the cap and the knob support, the ends of said spring being connected respectively to said cap and to said knob support to urge the knob support pivotally about the support post to swing the knob toward its retracted position, and a screw penetrating said cap and screwed into a threaded hole provided therefor in said body to clamp said cap in rotatively adjusted position relative to said body.

2. A spinning knob for a steering wheel comprising a body portion formed to have interfitting relation with a steering wheel element, a clamp member mounted to secure said body portion to the steering wheel, a knob support pivoted on said body portion, a knob mounted on said knob support for swinging movement from a retracted position within the plane of the steering wheel to upright extended position, a rotatively adjustable cap mounted to abut said body portion and spaced from said knob support to free said knob support for rotative movement relative to said body portion and said cap, a peripheral portion of the cap being exposed for grasping in adjusting the cap, a torsion coil spring mounted within a cavity provided therefor between the cap and the knob support, the ends of said spring being connected respectively to said cap and to said knob support to urge the knob support pivotally to swing the knob toward its retracted position, and means for exerting a compressive force on said cap to hold it and the spring end connected thereto in rotatively adjusted position relative to said body.

3. In a spinning knob for a steering wheel comprising a body portion formed for mounting within the rim of a steering wheel, and a clamp member mounted to secure said body portion to the steering wheel; a knob support comprising an abutment formed integrally with said body portion and of substantially quadrantal cross sectional shape, the sides of the quadrantal abutment comprising a pair of stop faces, a knob body member mounted for swivel movement on said abutment with its swivel axis disposed substantially radially of a steering wheel when mounted thereon, a knob mounted on said knob body to extend radially from said swivel axis, a stop lug on said knob body extending laterally alongside said abutment, said lug having a stop face formed thereon facing said abutment selectively to engage said abutment faces to limit swivel movement of the knob body to swing the knob from an upright operative position to a retracted position within the rim of the steering wheel, and biasing means mounted to urge the knob body pivotally about its swivel axis in a direction to swing the knob toward its retracted position.

4. In a spinning knob for a steering wheel comprising a body portion formed for mounting within the rim of a steering wheel, and a clamp member mounted to secure said body portion to the steering wheel; a knob support comprising an abutment formed integrally with said body portion and having a pair of stop faces thereon, a knob body member mounted for swivel movement on said abutment with its swivel axis disposed substantially radially of a steering wheel when mounted thereon, a knob mounted on said knob body to extend radially from said swivel axis, a stop lug fixedly mounted on said knob body to overlie said abutment, said lug having an inwardly directed face positioned outwardly of said abutment selectively to engage said abutment faces to limit swivel movement of the knob body to swing the knob from a retracted position within the rim of the steering wheel to an upright operative position, said lug being positioned in laterally offset relative to said axis of swivel movement with the knob in upright position to unbalance the knob support in a direction to gravitate rotatively about the swivel axis to swing the knob toward retracted position, and biasing means mounted to urge the knob body pivotally about its axis of swivel support to swing the knob toward its retracted position.

References Cited in the file of this patent

UNITED STATES PATENTS

| | | |
|---|---|---|
| 2,139,546 | Hansen | Dec. 6, 1938 |
| 2,312,638 | Gedris | Mar. 2, 1943 |
| 2,339,013 | Higgins | Jan. 11, 1944 |
| 2,549,774 | Chambers | Apr. 24, 1951 |
| 2,561,961 | White | July 24, 1951 |
| 2,579,165 | Woodruff | Dec. 18, 1951 |
| 2,592,413 | Garfield | Apr. 8, 1952 |

FOREIGN PATENTS

| | | |
|---|---|---|
| 753,244 | France | Aug. 7, 1933 |